UNITED STATES PATENT OFFICE.

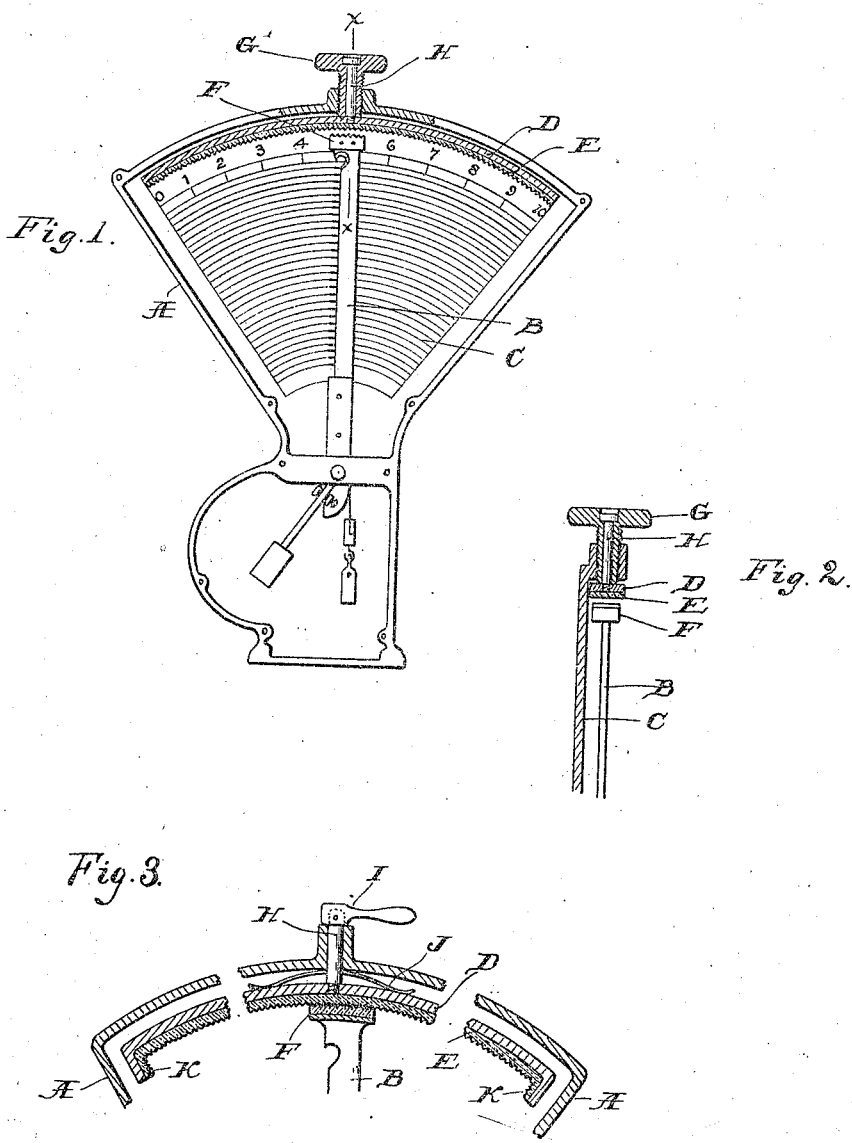

BYRON E. BUTLER, OF BAD AXE, MICHIGAN.

ATTACHMENT FOR SCALE-INDICATORS.

No. 887,917.　　　　Specification of Letters Patent.　　　　Patented May 19, 1908.

Application filed November 13, 1907. Serial No. 402,538.

*To all whom it may concern:*

Be it known that I, BYRON E. BUTLER, a citizen of the United States of America, residing at Bad Axe, in the county of Huron and State of Michigan, have invented certain new and useful Improvements in Attachments for Scale-Indicators, of which the following is a specification, reference being had therein to the accompanying drawings.

This invention relates more particularly to price scales in which a pivoted indicator hand actuated by the weighing mechanism registers with the graduations upon a price chart and the invention has the two-fold object in view to provide means for locking the indicator hand in its indicating position and for checking the same to prevent it from violently striking the casing as may be the result in roughly putting on or off heavy articles. To this end I have devised an attachment comprising certain parts applied to the indicator all as more fully hereinafter set forth and shown in the accompanying drawings in which:—

Figure 1 is an elevation of the index of a price scale of known construction, the cover of the casing being removed. Fig. 2 is a cross-section on line $x$—$x$, Fig. 1. Fig. 3 is a section in a plane at right angles to Fig. 2 and illustrating a modified construction of my invention.

In the drawings A is the segmental casing of the index, B the pivoted indicator hand actuated by the weighing mechanism (not shown) and C the price chart with which the index hand registers, all the parts being of known description and operation and forming no part of my invention.

In carrying out my invention I suspend in the top of the casing adjacent to the path of the indicator hand a friction bar D which upon its underside is faced with a strip E of rubber, leather or other suitable material preferably serrated as shown and correspondingly therewith I face the adjacent free end of the indicator hand with a piece F of like material, all so arranged that the bar D may be lowered and caused to bear against the end of the indicator hand in whatever position the same may be held and thereby lock it in position against the action of the weighing mechanism.

I do not confine myself to any particular means for raising and lowering the bar D as this may be accomplished in many different ways. As illustrated in Fig. 1, it is accomplished by means of a screw G, screw-threaded in the top of the casing and bearing against the top of the bar D, the latter being swiveled to the screw by means of a stem H secured to the bar.

In Fig. 3 I show a modified form of suspension in which a signal lever I is pivotally secured to the top of stem H and a spring J bears upon the top of the bar D, all so arranged that when the signal lever is turned down as in Fig. 3, the spring presses the bar D into engagement with the end of the indicator arm and when it is up the indicator arm is free to move. The signal lever I thus forms a visual indicator for the bar D.

In practice the device saves much time in selling goods, since the salesman after weighing the goods can arrest the indicating hand and hold it in its indicating position, thus giving the customer ample time to verify the price upon the price chart, while the salesman removes the goods from the scale and wraps them up. The device also serves as a check for the indicator arm since it cannot move while it is held by the bar and in being released for weighing the release is gradual owing to the elastic nature of the contacting faces which are preferably serrated as shown. If desired the ends of the bar D may be turned down to form stops or buffers K at the ends thereof as shown in Fig. 3 for the indicating hand to strike against.

What I claim as my invention is:—

1. In a scale, the combination with the casing inclosing the price chart and the pivoted indicator hand coacting therewith, of a friction bar supported in the casing above the indicator hand and being coextensive with the path thereof and means for raising and lowering said bar into and out of engagement with the index hand.

2. The combination with the casing and pivoted indicator hand, of a price scale, of a friction bar vertically movably supported in the casing above the index hand and being coextensive with the path thereof and a friction block at the end of the index hand with which said bar is adapted to be moved into engagement to prevent the movement of the index hand.

3. The combination with the casing, the price chart and the pivoted indicator hand of a price scale, of a friction bar suspended in the top of the casing adjacent to and coextensive with the path of the indicator hand and means for raising said bar in and out of frictional engagement with the indicator hand, said means having an actuating indicating lever.

4. The combination with the casing and pivoted indicator hand of a price scale, of a friction bar supported in the casing in proximity to the path of the index hand and coextensive therewith, a friction block affixed to the end of the indicating hand, said friction bar and friction block provided with serrated faces of rubber and a screw adapted to carry the friction bar in and out of locking engagement with the indicator hand.

In testimony whereof I affix my signature in presence of two witnesses.

BYRON E. BUTLER.

Witnesses:
J. R. HARRIS,
JAMES L. BURGESS.